United States Patent [19]

Lecron et al.

[11] Patent Number: 4,473,387
[45] Date of Patent: Sep. 25, 1984

[54] FIBERIZING APPARATUS INTENDED FOR THE MANUFACTURE OF CONTINUOUS GLASS FIBERS

[75] Inventors: Jacques Lecron, Challes les Eaux; Maxime Manera, Jacob Bellecombette; Jean-Paul Faure, Chignin; Jean-Pierre Renaudin, Cognin, all of France

[73] Assignee: Societe Vetrotex Saint-Gobain, Chambery, France

[21] Appl. No.: 543,527

[22] Filed: Oct. 20, 1983

Related U.S. Application Data

[63] Continuation-in-part of Ser. No. 491,056, May 3, 1983, which is a continuation-in-part of Ser. No. 374,272, May 3, 1982, Pat. No. 4,398,933, which is a continuation-in-part of Ser. No. 207,712, Nov. 17, 1980, abandoned.

[30] Foreign Application Priority Data

Oct. 28, 1982 [FR] France .............................. 82 18062

[51] Int. Cl.³ ........................................ C03D 37/085
[52] U.S. Cl. .............................................. 65/1; 65/2; 65/12; 264/169; 425/725
[58] Field of Search ................... 65/1, 2, 12; 264/169; 425/725

[56] References Cited

U.S. PATENT DOCUMENTS

| | | | |
|---|---|---|---|
| 4,155,732 | 5/1979 | Schlachter et al. | 65/1 |
| 4,318,680 | 3/1982 | Pfeiffer et al. | 425/382.2 |
| 4,330,312 | 5/1982 | Hill | 65/1 |
| 4,343,635 | 8/1982 | Kim et al. | 65/1 |
| 4,349,364 | 9/1982 | Morrison | 65/2 |
| 4,391,618 | 7/1983 | Lecron et al. | 65/1 |
| 4,398,933 | 8/1983 | Lecron et al. | 65/1 |
| 4,401,451 | 8/1983 | Lecron et al. | 65/1 |

FOREIGN PATENT DOCUMENTS

7500601 8/1976 France .
763160 12/1956 United Kingdom .

Primary Examiner—Robert L. Lindsay, Jr.
Attorney, Agent, or Firm—John T. Synnestvedt; Charles H. Lindrooth

[57] ABSTRACT

Apparatus for the manufacture of thermoplastic mineral fibers is disclosed.

A bushing base is formed by a flat plate in which a multitude of conduits are arranged. The upper ends of the conduits open toward the inside of the bushing and their lower ends toward a multitude of small alveoles, each alveole being in communication with the inside of the bushing by means of one of the said conduits. A continuous flat wall closes the base of each alveole, the said wall being perforated by several orifices forming a grouping of orifices.

14 Claims, 9 Drawing Figures

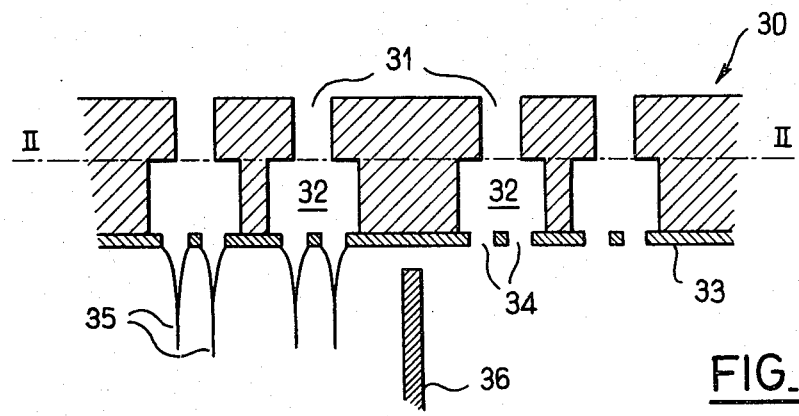
FIG_2
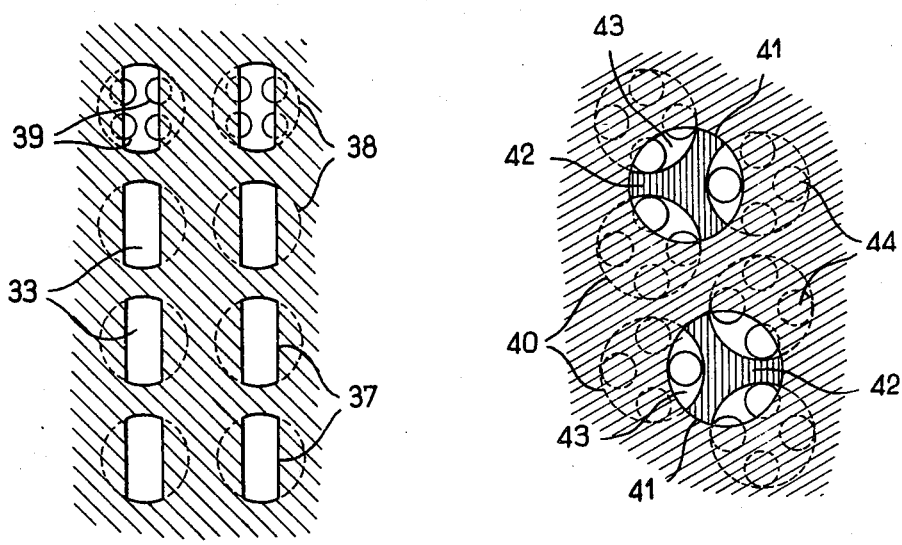
FIG_3
FIG_4
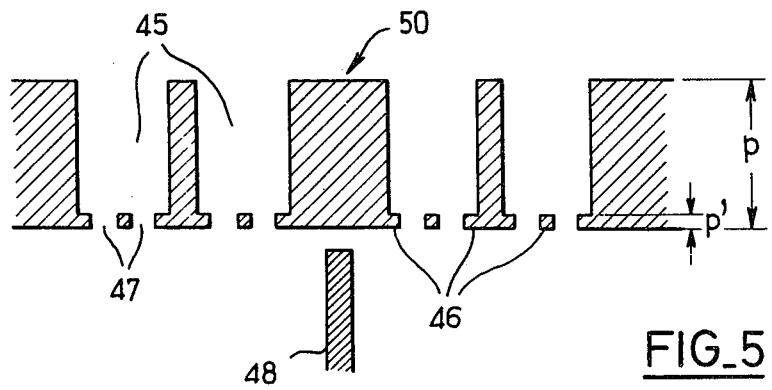
FIG_5

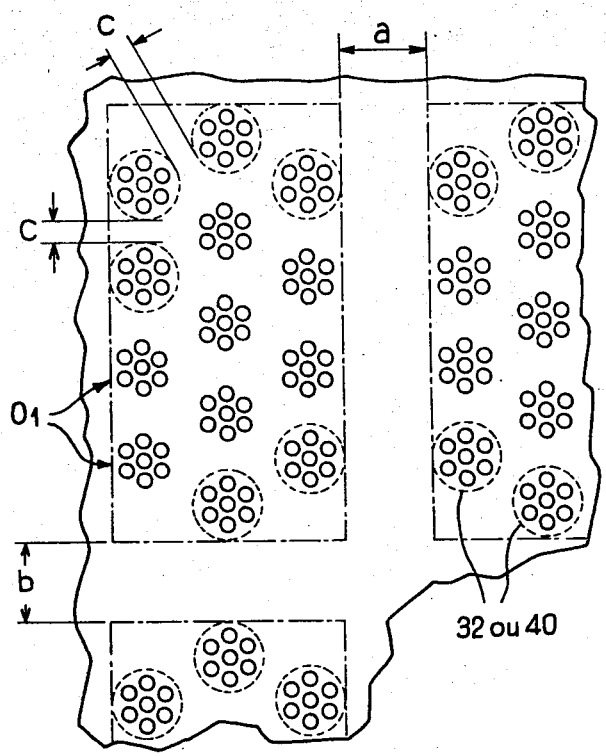
FIG_6
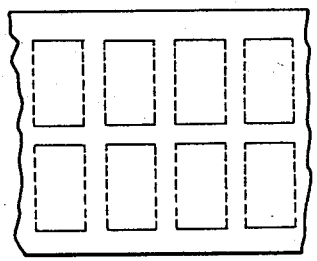
FIG_7
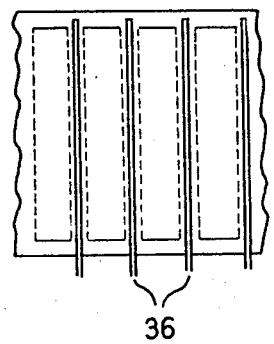
FIG_9
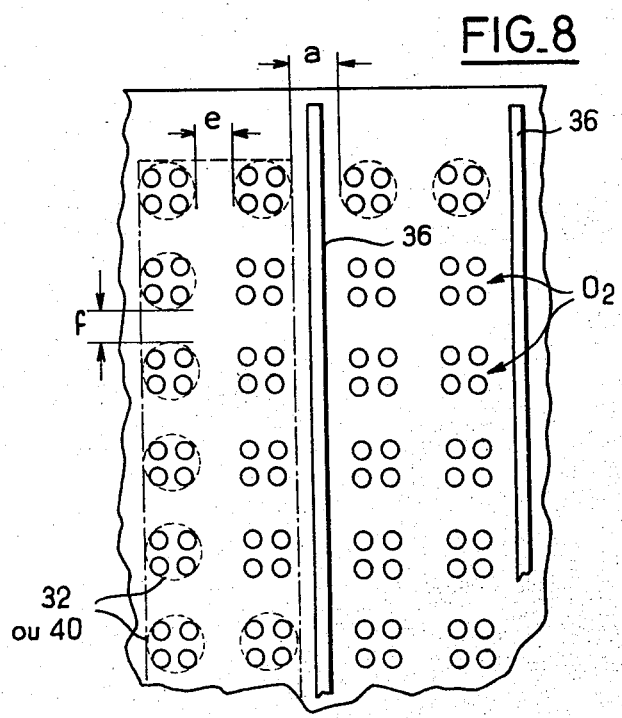
FIG_8

FIBERIZING APPARATUS INTENDED FOR THE MANUFACTURE OF CONTINUOUS GLASS FIBERS

RELATED APPLICATIONS

This application is a continuation-in-part of our copending application Ser. No. 491,056 filed May 3, 1983, which in turn is a continuation-in-part of our co-pending application Ser. No. 374,272 filed May 3, 1982, now U.S. Pat. No. 4,398,933 which in turn is a continuation-in-part of application Ser. No. 207,712 filed Nov. 17, 1980 and now abandoned.

FIELD OF THE INVENTION

The present invention relates to apparatus intended for the manufacture of fibers of thermoplastic mineral materials, by attenuation of molten material exiting from orifices formed in a perforated plate containing a large number of orifices.

More particularly, it concerns the manufacture of continuous glass fibers by mechanical attenuation of strands and filaments formed downstream of the perforated plate, these filaments being wound on a generally cylindrical support.

BACKGROUND AND PRIOR ART

Among the various forms of apparatus of the prior art, a certain number exist comprising bushings wherein a bushing base is perforated by a large number of orifices, generally arranged very close together.

For these bushings, the main objective to attain is to prevent or limit the covering of the bottom side of the bushing by the molten glass. This phenomenon, called flooding, can appear just as easily at the moment of start-up of the bushing as during attenuation of the filaments.

Various solutions have been recommended to resolve this difficulty. In general these solutions contemplate, separately or in combination, the permanent cooling of the bushing base by the action of a gas flow, a particular arrangement of the orifices on the said base, and a particular structure of the bushing base.

With regard to the invention described below, the following prior art will illustrate known techniques in this field.

U.S. Pat. No. 3,574,581 describes bushings supplied with molten glass under pressure, wherein the base is constructed to resist the pressure. Thus, this base can be formed by a thin metallic plate bent up a certain number of times forming a series of undulations, the walls of which are joined. This structure defines a series of parallel channels, each having a rounded base which is perforated by a row of orifices. The base can also be formed by two plates joined locally which defines an intermediary compartment between the inside of the bushing and the perforated zones from where the filaments are formed. The top plate, which confers the rigidity to the base, is thick and is equipped on its base with a series of protuberances, on the bottom side of which is joined a second, much thinner plate. This second plate has a series of very small cavities, exteriorly defined by segments of a sphere perforated by one or several orifices.

In either case, the flooding problems are surmounted because of the action of the pressure which enables the filaments to be extruded.

However, the maintenance of the molten glass under a pressure of on the order of about 10 bars is not without a few problems which are difficult to resolve.

Another means of controlling the flooding is proposed by French patent No. 2,334,637. This patent describes a type of bushing of which the base is formed by a simple flat plate, perforated by a plurality of orifices; these orifices are arranged in zones, each one containing several tens of orifices closely arranged in groups of two or three.

This arrangement enables both the successive controlling of the flooding during the start-up of the bushing and the prevention of its propagation when a filament is broken accidentally.

This implies the permanent action of one or several jets of air directed toward the bushing base.

With this cooling method and this type of base, it is difficult to prevent very localized variations of the temperature of the glass, possibly leading to a chain breaking or to an uncontrolled flooding.

SUMMARY AND OBJECTS OF THE INVENTION

An object of the present invention is an apparatus including a bushing heated by Joule effect and intended for the manufacture of continuous glass fibers by mechanical attenuation, which reduces flooding and improves stability in the zones perforated by a plurality of orifices.

Another object of the present invention is a bushing of which the base is pierced by a large number of orifices from which it is possible to mechanically attenuate in a stable manner continuous glass filaments of small diameter.

The bushing according to the invention equips a fiberizing installation as defined below.

The fiberizing installation essentially includes a supply source of molten glass, connected to a bushing formed from flat metallic plates, a blower apparatus for, gas directed toward the bushing base, means for application of a coating or sizing to the glass filaments as well as elements for guiding and mechanically attenuating the filaments. The bushing base comprises a flat plate in which a multitude of conduits are arranged with their upper ends opening toward the inside of the bushing, their lower ends toward a multitude of small alveoles, each alveole being in communication with the inside of the bushing by means of one of the said conduits, a continuous wall closing the base of each alveole, the said wall being perforated by several orifices and having a flat, outer bottom side.

This installation can also include cooling elements, fixed in proximity to the bushing base, and capable of cooperating with the gas flow directed toward the base of the said bushing.

One of the characteristics of the invention is that the base of the conduits and the top of the alveoles in communication with the said conduits are situated in a same plane.

According to another characteristic of the invention, each conduit opens on one or several alveoles.

The conduits opening on one or several alveoles can have a uniform cross section throughout. When each conduit opens on a single alveole the section of the said conduits can be equal to the section of the corresponding alveole, at the junction point of the said alveole with the said conduit. Each alveole can also have a uniform cross section throughout.

BRIEF DESCRIPTION OF THE DRAWINGS

The invention and its various characteristics are explained in the detailed description, given herebelow, with reference to the following figures:

FIG. 2 is a vertical section of a part of the bushing base according to a first embodiment;

FIG. 3 is a plan view of the top side of a part of the bushing base, such as represented in FIG. 2;

FIG. 4 is a plan view of the top side of a part of the bushing base according to a second embodiment;

FIG. 5 is a vertical section of a part of the bushing base according to a third embodiment;

FIG. 6 is a plan view of the bottom side of a part of a bushing base according to a fourth embodiment of the invention;

FIG. 7 is a plan view, on a smaller scale than the one preceding, of the bottom side of a part of the base represented in FIG. 6, and showing the distribution of the orifices on the said base;

FIG. 8 is a plan view of the bottom side of a part of a bushing base, according to a fifth embodiment of the invention; and FIG. 9 is a plan view, on a smaller scale than the one preceding, of the bottom side of a part of the base represented in FIG. 8 and showing the distribution of the orifices on the said base.

DESCRIPTION OF THE PREFERRED EMBODIMENTS

Figure 1:
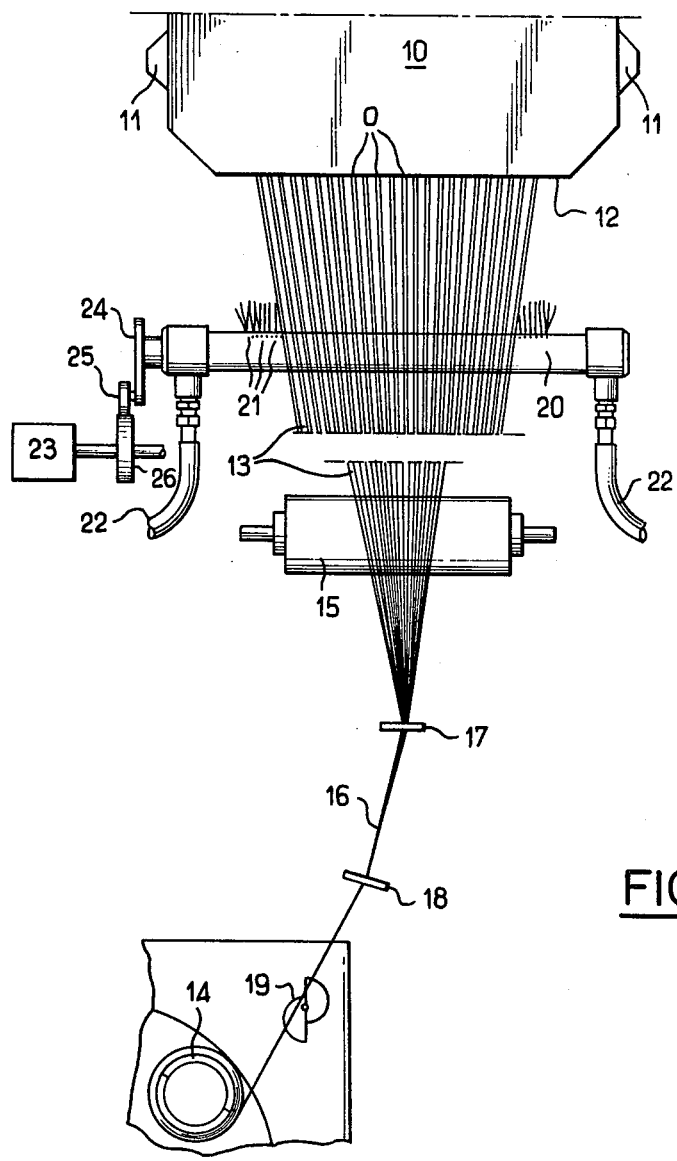
FIG. 1 is a front elevational view, wherein certain parts are removed, and which schematically represents a fiberizing installation equipped with a bushing according to the invention.

The bushing 10, generally manufactured from flat plates of platinum alloy, is equipped with terminals 11 for the supply of electric current used for its heating by Joule effect. It contains molten glass which is flowed through orifices distributed on the bottom side of a flat plate 12, a multitude of groupings of several orifices O situated perpendicularly below each alveole. The bushing communicates with a supply source of glass of a known type which can be either the forehearth of a direct melting furnace from which the glass is flowed directly in the bushing in the molten state, or a supply system feeding the glass in the form of small marbles, which are then re-melted in the bushing. Whatever the supply source utilized, the flow of the molten glass through the orifices is essentially assured by the hydrostatic pressure of the melting mass located above the plate. The glass is attenuated in elementary filaments 13, in a traditional manner, by the intermediary of a rotating spindle 14. After deposit of sizing by means of a sizing element schematically shown at 15, the filaments are collected in one or several strands 16 by the usual elements employed in this technique, such as the combs 17 and 18; the strand is next wound around the rotating spindle 14, along which it is displaced under the influence of a distribution element or helix 19.

A blowing manifold 20, equipped for example with a series of openings 21, is installed in proximity to and below the fiberizing plane, the openings 21 being directed toward the bushing base. The said openings can take the form of nozzles or orifices arranged very close together, placed parallel to the longitudinal axis of the bushing. The manifold 20 is joined by the conduits 22 to a gas source not shown. It can be stationary, rotary or oscillatory. In the latter case, illustrated in FIG. 1, one of its ends is connected to a motor by the intermediary of a follower arm 24 equipped with a roller 25 applied on the bearing surface of a cam 26 fastened on the shaft of motor 23. Other blower means known to those skilled in the art can be adapted on the installation equipped with bushings according to the invention.

The gas flow directed toward the bottom side of the plate 12 can be used uniquely at the moment of start-up of the fiberizing operation or during the entire duration of this operation. This depends on the arrangement of the various orifice groupings O on the bushing base, on the number of orifices per grouping, on the presence or absence of cooling elements.

FIG. 2 represents one bushing embodiment according to the invention.

In this example, the bushing base is formed by a plate 30 of platinum alloy, resistant to oxidation at high temperature, such as the alloy formed from 90% platinum and 10% rhodium.

A multitude of conduits 31 are arranged in the top part of the plate 30; they are opened at their top part toward the interior of the bushing, and at their bottom part communicate with alveoles 32. The base of the conduits and the top of the alveoles in communication with the said conduits are located in the same plane II—II. The alveoles 32 are arranged in the bottom part of the plate 30 and are closed at their base by a wall formed by a thin plate 33; this plate 33 is fastened to the plate 30 by any adequate joining means known to those of ordinary skill in the art.

In vertical alignment with the alveoles 32, the plate 33 is perforated by several orifices 34 through which the glass is flowed to form continuous filaments 35. In the embodiment represented in FIG. 2, the conduits 31 have an identical section throughout and are joined, after the discharge point, to the alveoles 32 which have a larger section than that of the conduits. These alveoles can also have a uniform section throughout. Cooling elements, such as fins 36, can be placed in proximity to the plate 33.

FIG. 3, which is a plan view of a part of the top side of the base of a bushing similar in construction to FIG. 2, showing differences which may exist between the sections of the conduits as illustrated at 37 and the alveoles as illustrated at 38; in this case, these latter are of circular shape. The plate 33 is perforated by orifices 39, at the rate of four orifices per alveole; these orifices are arranged regularly at the corners of a square of which the center coincides with that of the base of the alveole.

The plate 33 is of a platinum alloy, identical to the one forming the plate 30 or different and chosen particularly as a function of the degree of wettability that it presents with regard to the molten glass utilized. An alloy of which the degree of wettability is relatively low can reduce and even eliminate the flooding phenomenon.

In the case of E glass, the glass generally used for the manufacture of continuous fibers, it is effected with an alloy of 93% platinum, 3% iridium and 4% gold. The angle of contact of the E glass on a plate formed from such an alloy, brought to 1150° C., is 75° while it is 39° at the same temperature on a plate of platinum with 10% rhodium.

Other types of sections, uniform or not, are possible for the corresponding conduits and/or alveoles, their joining together being less abrupt than a simple discharge at a right angle.

FIG. 4 represents an embodiment according to which a given conduit can supply several alveoles with molten glass. In this example, cylindrically shaped alveoles 40 are machined in the bottom part of the flat plate forming the bushing base, according to a staggered arrangement. In the top part of the said plate, conduits 41, also cylindrical, are machined overlying three alveoles and interconnecting the top of the metal mass 42 which separates the alveoles 40. The glass supplying the conduits 41 is flowed toward the alveoles through the openings 43 created by the machining. As in the embodiment illustrated by FIG. 2, the base of the alveoles is closed by a flat plate in which orifices 44 are pierced, at the rate of four orifices per alveole.

A further, particularly simple embodiment is the one represented in FIG. 5. This is the case where the conduit and the alveole have the same uniform section throughout. They thus define a cavity 45 which can be, for example, cylindrical. The plate 50 is simply machined, leaving a thin wall 46 at the base of the cavities 45 which is then pierced with several orifices 47 per cavity. Cooling elements, such as fins 48, can be placed in proximity to the wall 46.

Because of the distribution of the orifices at the base of each alveole or cavity, these latter are present in the form of groupings regularly distributed on the bushing base. FIGS. 6 and 8 represent two examples of orifice groupings referenced as $O_1$ and $O_2$. These groupings containing 4 or 7 orifices are arranged at the base of alveoles 32 or cavities 40, such as represented in FIGS. 2 and 5.

The number of orifices per alveole, the distance separating two adjacent orifices belonging to a same grouping or the distance separating two adjacent alveoles or cavities are parameters which can vary from one exemplary embodiment to another, and which depend especially on the thickness of the base and the cooling method utilized. And of the nature of the alloy constituting the planar bottom wall of the bushing.

The base of the bushings according to the invention can be cooled by a gas current, and/or by a cooling apparatus containing fins such as represented in FIGS. 2, 5, 8 and 9. These fins possess a good thermal conductivity and are connected to at least one manifold, not shown, in which a cooling liquid, such as water, circulates.

The alveoles or cavities can be arranged in rows perpendicular to the longitudinal axis of the bushing. These rows are single, double or multiple in staggered arrangement, as is represented in FIGS. 6 and 8. In these last two cases, the orifice groupings are arranged by zone, as is shown in FIGS. 7 and 9.

The distances "a" and "b" separating two adjacent zones, in the longitudinal and transverse directions respectively, can range from 2.5 to 6 mm and preferably from 3 to 4 mm.

In each row, the distances "c" or "f" separating two adjacent alveoles or cavities are at least equal to 0.2 mm and are preferably comprised between 0.5 and 1.5 mm. The distance "e", which separates two adjacent alveoles or cavities belonging to two different rows, is at most equal to 5 mm; in the case of a staggered arrangement (see FIG. 4) this distance can be zero and even negative.

The total thickness p of the bushing base is comprised between 3 and 10 mm, whereas the thickness p' of the plate 33, or of the wall 41, can range between 0.2 and 2 mm; p' is preferably comprised between 0.4 and 1 mm.

These last dimensional characteristics are important and are at the origin of different advantages of the bushings according to the invention over the known bushings.

The flat-base bushings of the prior art are generally equipped with a flat plate, perforated by a plurality of orifices, which is thin to prevent too high a load loss during the flow of the glass in the said orifices.

This plate is fairly rapidly deformed under the conjoined effect of the heat and pressure exerted by the glass. It is also necessary to reinforce the bushing base with channels, for example, as described in U.S. Pat. No. 3,988,135.

The structure of the plate forming the bushing base according to the invention prevents the deformations because of the thickness p without so much as increasing the losses of load; furthermore, the passage section of the openings at the entry of each alveole possibly varying considerably according to the dimensions of the conduits and/or their arrangement with regard to the alveoles, the numerous combinations offered in the material enable the losses of load to be reduced. In addition, the thickness p' which can be selected as thin as possible, independently of p, allows the attainment of higher output through orifices of small diameter.

Besides these advantages, the thickness p of the plate enables the glass to be cooled effectively at the time of restart of the bushing or during the fiberizing operation, without disrupting the operation of the said bushing for a long period of time. This is even better noted when, for a determined thickness p, the quantity of alloy conserved is larger. It is in this way that the structure illustrated by FIG. 2 can be selected in preference to that of FIG. 5, as a function of the desired orifice density, or, for example, of the cooling method adopted.

Another advantage of bushings according to the invention is the following. When a breakage occurs during the fiberizing operation, the flooding which can result is often limited to one group of orifices O; it can be extended to several groups of a same zone, however, it will only propagate from one zone to another in exceptional cases. This considerably facilitates the restart of the bushing and decreases the intervention time of the operator.

It is quite clear that the modifications to the modes of embodiment given hereabove can be made without going beyond the scope of the invention.

We claim:

1. An apparatus for the manufacture of continuous glass fibers including a supply source of glass achieved by simple gravity, connected to a bushing heated by Joule effect and of which the flat, bottom side is perforated by a plurality of orifices arranged very close together forming groups distributed regularly by zones, characterized in that the bushing base is formed by a flat plate in which a multitude of conduits are arranged opening at their top part toward the interior of the bushing, and at their bottom part toward a multitude of alveoles, each alveole being in communication with the interior of the bushing by the intermediary of one of the said conduits, a continuous, flat wall closing the base of each alveole, the said wall being perforated by several orifices forming a grouping of orifices, the orifices of each alveole being in communication with at least one of said conduits.

2. A fiberizing apparatus according to claim 1, characterized in that the base of the conduits and the summit of the alveoles in communication with the said conduits are located in the same plane.

3. A fiberizing apparatus according to either one of the preceding claims, characterized in that in the bushing base each conduit opens on a single alveole.

4. A fiberizing apparatus according to claims 1 or 2 characterized in that the section of each conduit is uniform throughout.

5. A fiberizing apparatus according to claim 4, characterized in that the section of each alveole is uniform throughout.

6. A fiberizing apparatus according to claim 5, characterized in that the section of each conduit is equal to the section of the top part of each alveole communicating with the said conduit.

7. A fiberizing apparatus according to claims 1 or 2, characterized in that the bushing base is made from a single piece.

8. A fiberizing apparatus according to claims 1 or 2, characterized in that the wall closing the base of the alveoles is formed by a flat plate, joined to the bottom side of the plate in which the conduits and the alveoles have been arranged.

9. A fiberizing apparatus according to claims 1 or 2, characterized in that the bushing base is manufactured from the same metal alloy.

10. A fiberizing apparatus according to claim 8, characterized in that the flat plate closing the base of each alveole is made from an alloy of which the angle of contact with the molten glass at 1150° C. is greater than or equal to 60°.

11. A fiberizing apparatus according to claims 1 or 2, characterized in that the distribution of the alveoles in the plate is such that they form rows perpendicular to the longitudinal axis of the bushing.

12. A fiberizing apparatus according to claim 11, characterized in that the alveoles are in a staggered arrangement.

13. A fiberizing apparatus according to claim 12, characterized in that the alveoles are regrouped by zones.

14. A fiberizing apparatus according to claims 1 or 2, characterized in that the section of each alveole and of each conduit is circular.

* * * * *